[[[]]]

(12) United States Patent
Abramczyk et al.

(10) Patent No.: US 11,491,945 B2
(45) Date of Patent: Nov. 8, 2022

(54) AIRBAG ASSEMBLY WITH SELECTIVELY INFLATABLE INFLATION CHAMBERS

(71) Applicant: Ford Global Technologies, LLC, Dearborn, MI (US)

(72) Inventors: Joseph E. Abramczyk, Farmington Hills, MI (US); Zhibing Deng, Northville, MI (US); Deepak Patel, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 17/225,248

(22) Filed: Apr. 8, 2021

(65) Prior Publication Data
US 2022/0324405 A1 Oct. 13, 2022

(51) Int. Cl.
*B60R 21/21* (2011.01)
*B60R 21/015* (2006.01)
*B60R 21/233* (2006.01)
*B60R 21/231* (2011.01)

(52) U.S. Cl.
CPC ........ *B60R 21/21* (2013.01); *B60R 21/01554* (2014.10); *B60R 21/233* (2013.01); *B60R 21/23138* (2013.01)

(58) Field of Classification Search
CPC . B60R 21/21; B60R 21/01554; B60R 21/233; B60R 2021/23308
See application file for complete search history.

(56) References Cited

U.S. PATENT DOCUMENTS

| | | | | |
|---|---|---|---|---|
| 5,364,125 A | * | 11/1994 | Brown | B60R 21/01554 |
| | | | | 280/736 |
| 5,893,582 A | | 4/1999 | Allen et al. | |
| 5,921,576 A | * | 7/1999 | Sinnhuber | B60R 21/217 |
| | | | | 280/730.2 |
| 6,053,529 A | | 4/2000 | Frusti et al. | |
| 6,129,380 A | | 10/2000 | Rink et al. | |
| 6,231,077 B1 | * | 5/2001 | Karolek | F16K 31/0606 |
| | | | | 280/742 |
| 7,147,261 B2 | | 12/2006 | Ventura et al. | |
| 7,527,292 B2 | * | 5/2009 | Jessup | B60R 21/232 |
| | | | | 280/743.2 |
| 7,591,481 B2 | * | 9/2009 | McCormick | B60R 21/26 |
| | | | | 280/736 |
| 9,139,153 B2 | | 9/2015 | Deng et al. | |
| 9,174,604 B2 | * | 11/2015 | Wellhoefer | B60N 2/42754 |
| 10,501,043 B2 | | 12/2019 | Ghannam et al. | |
| 10,525,925 B2 | | 1/2020 | Deng et al. | |

(Continued)

FOREIGN PATENT DOCUMENTS

KR 100256047 B1 5/2000

*Primary Examiner* — Paul N Dickson
*Assistant Examiner* — Tiffany L Webb
(74) *Attorney, Agent, or Firm* — Frank A. Mackenzie; Bejin Bieneman PLC (57) ABSTRACT

A system for a vehicle includes computer including a processor and a memory storing instructions executable by the processor to identify a longitudinal position of a seat. The instructions include to identify a rotational position of the seat. The instructions include to selectively inflate one or more of a plurality of inflation chambers of an airbag adjacent the seat based on the longitudinal position and the rotational position of the seat.

19 Claims, 6 Drawing Sheets

(56) References Cited

U.S. PATENT DOCUMENTS

| | | |
|---|---|---|
| 10,589,705 B2 | 3/2020 | O'Connor et al. |
| 10,596,992 B2 * | 3/2020 | Choi .................... B60R 21/216 |
| 10,730,472 B2 | 8/2020 | Perez |
| 10,766,448 B2 | 9/2020 | Wiscombe et al. |
| 10,821,928 B2 * | 11/2020 | Deng ................ B60R 21/23138 |
| 10,960,839 B2 * | 3/2021 | Imura ................ B60R 21/01554 |
| 11,338,706 B2 * | 5/2022 | Kobayashi ............... B60N 2/14 |
| 2005/0035577 A1 | 2/2005 | Barko et al. |
| 2017/0210329 A1 | 7/2017 | Rao et al. |
| 2020/0130634 A1 | 4/2020 | Rutgersson et al. |
| 2020/0207299 A1 | 7/2020 | Cheng |
| 2020/0290549 A1 * | 9/2020 | Buice .................... B60R 21/217 |
| 2021/0107422 A1 * | 4/2021 | Dewey .................... B60Q 9/00 |

* cited by examiner

AIRBAG ASSEMBLY WITH SELECTIVELY INFLATABLE INFLATION CHAMBERS

BACKGROUND

A vehicle may include amenities that allow occupants to face one another during operation of the vehicle. As one example, an autonomous vehicle may be autonomously operated, allowing occupants of the vehicle to ride in the vehicle without monitoring the operation of the vehicle. Specifically, the autonomous vehicle may include seats free to rotate between rides of the vehicle between forward-facing and rearward-facing positions.

DETAILED DESCRIPTION

A system comprising a computer including a processor and a memory storing instructions executable by the processor to identify a longitudinal position of a vehicle seat. The instructions include to identify a rotational position of the vehicle seat. The instructions include to selectively inflate one or more of a plurality of inflation chambers of an airbag adjacent the vehicle seat based on the longitudinal position and the rotational position of the vehicle seat.

The instructions may include to selectively inflate the one or more of a plurality of inflation chambers includes instructions to activate an inflator.

The instructions may include to selectively inflate the one or more of a plurality of inflation chambers includes instructions to release one or more of a plurality of control valves between the inflator and each of the inflation chambers.

The instructions may include to release one or more of the plurality of control valves include instructions to release a solenoid of at least one of the control valves.

The system may include a plurality of fill tubes, each fill tube extending from the inflator to each of the inflation chambers.

The system may include a fill tube extending continuously from the inflator to all the inflation chambers.

The plurality of inflation chambers may be fluidly isolated from each other.

The system may include a plurality of uninflatable panels, each of the uninflatable panels being between each of the inflation chambers.

A vehicle includes a seat. The vehicle includes an airbag assembly including a plurality of inflation chambers fluidly isolated from each other. The vehicle includes a computer including a processor and a memory storing instructions executable by the processor to identify a longitudinal position of the seat. The instructions include to identify a rotational position of the seat. The instructions include selectively inflate one or more of the inflation chambers based the longitudinal position and the rotational position of the seat.

The airbag assembly may include an inflator fluidly connected to each of the inflation chambers.

The airbag assembly may include a plurality of control valves between the inflator and the inflation chambers.

The instructions may include to selectively inflate one or more of the inflation chambers include instructions to release at least one of the control valves.

Each of the control valves may include a solenoid and the instructions to release at least one of the control valves includes instructions to release the solenoids.

The vehicle may include a plurality of fill tubes, each fill tube extending from the inflator to each of the inflation chambers.

The inflator includes a fill tube extending continuously from the inflator to all the inflation chambers.

Each of the plurality of the inflation chambers are fluidly isolated from each other.

Each of the plurality of the inflation chambers are separated from each other along a vehicle-longitudinal direction.

The vehicle may include a door frame adjacent the seat, the airbag assembly being supported by the door frame adjacent the seat.

The vehicle may include a door-trim panel supported by the door frame, the airbag assembly being between the door frame and the door-trim panel.

Each of the plurality of inflation chambers are separated from each other along the door frame in a vehicle-longitudinal direction.

With reference to the Figures, wherein like numerals indicate like parts throughout the several views, a system 10 for a vehicle 12 includes a computer 14 including a processor and a memory storing instructions executable by the processor to identify a longitudinal position of a seat 16. The instructions include to identify a rotational position of the seat 16. The instructions include to selectively inflate one or more of a plurality of inflation chambers 18 of an airbag 20 adjacent the seat 16 based on the longitudinal position and the rotational position of the seat 16.

In the event of an impact, for example a side impact, the computer 14 identifies both the longitudinal position and the rotational position of the seat 16. Based on the longitudinal position and the rotational position, the computer 14 selectively inflates one or more inflation chambers 18 of the airbag 20. Depending on the longitudinal location and the rotational location of the seat 16, the computer 14 may inflate different inflation chambers 18 to control the kinematics of an occupant in the seat 16. The computer 14 identifies which and how many of the inflation chambers 18 to inflate to control the kinematics of the occupant in the seat 16.

Figure 1:
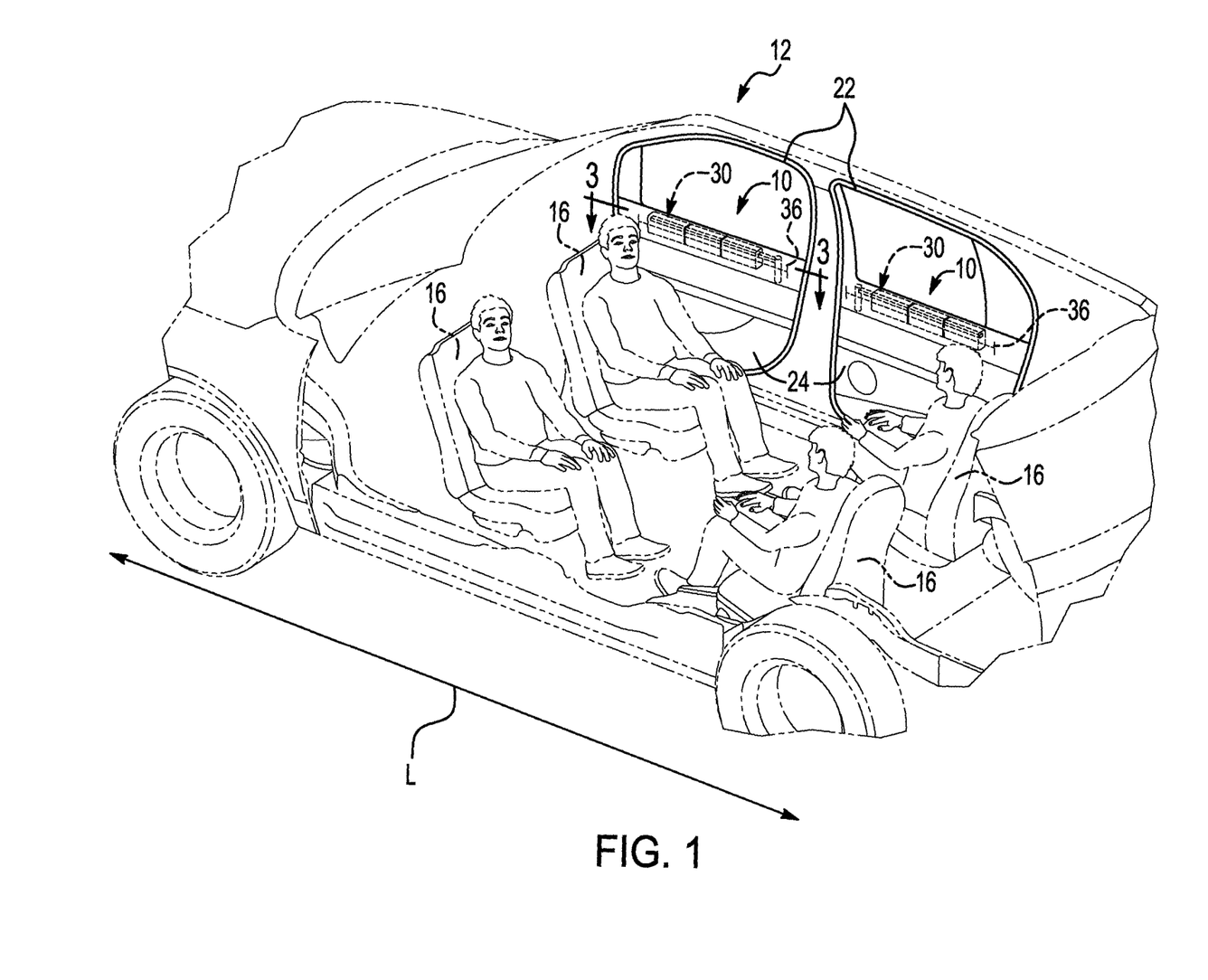
FIG. 1 is a perspective view of a vehicle including an airbag assembly supported by a door of the vehicle with airbags in an uninflated position.
Figure 2:
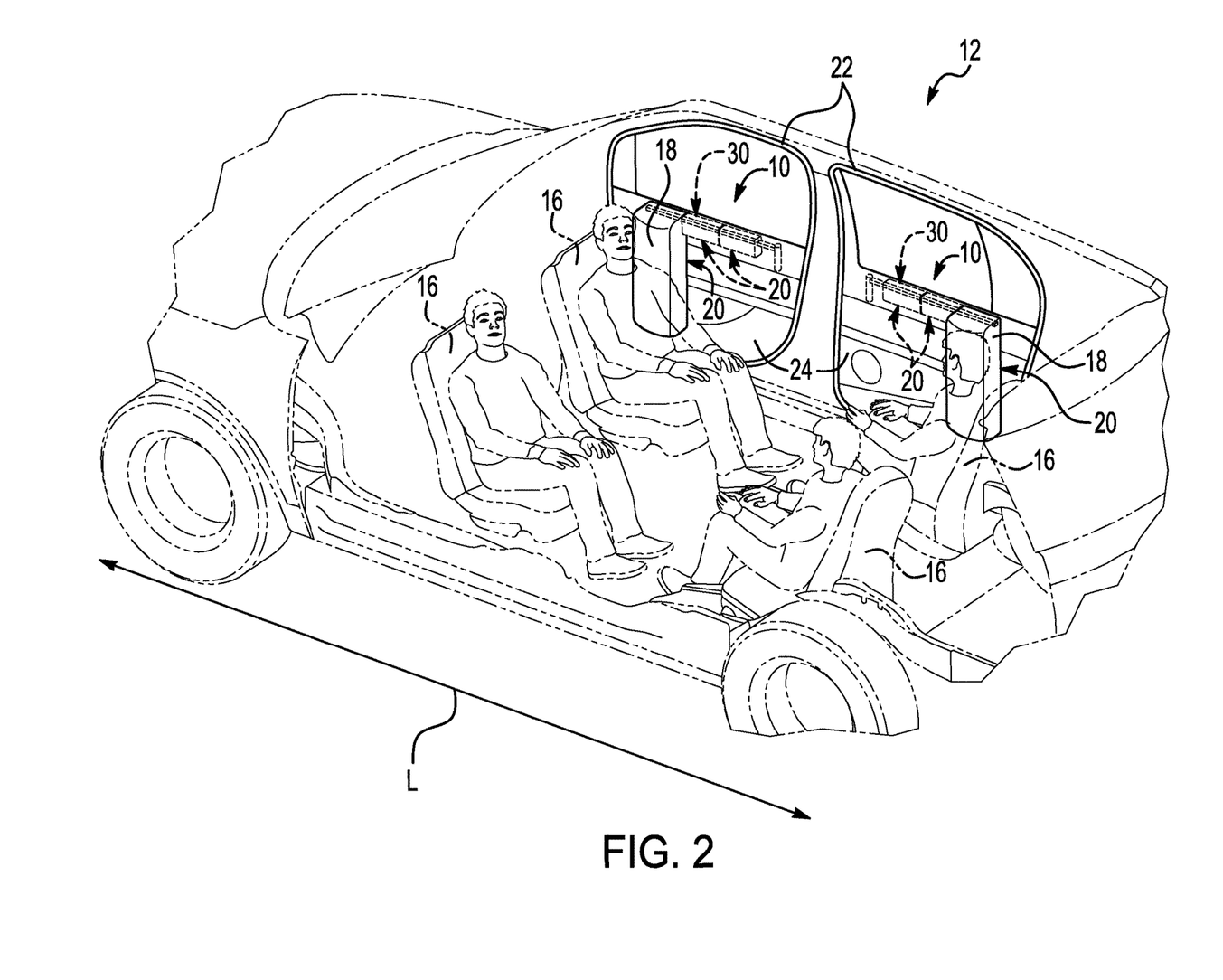
FIG. 2 is a perspective view of the vehicle including the airbag assembly supported by the door of the vehicle with some airbags in an inflated position.
Figures 3, 4A, 4B, 4C:
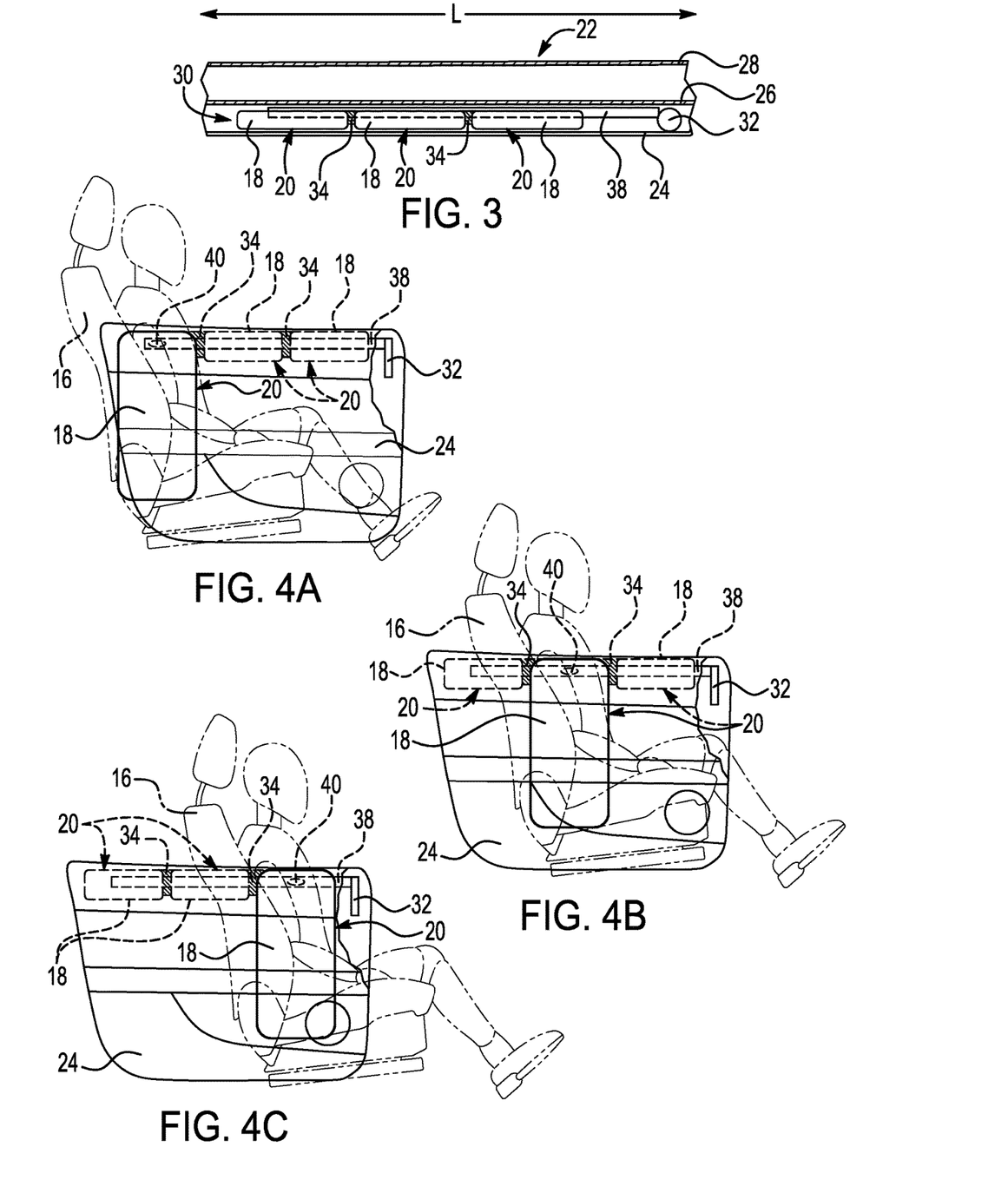
FIG. 3 is a cross-sectional view through line 3 of FIG. 1.
FIG. 4A is a side view of a seat in the forward-facing position adjacent the door with a third chamber in the inflated position.
FIG. 4B is a side view of the seat in the forward-facing position adjacent the door with a second chamber in the inflated position.
FIG. 4C is a side view of the seat in the forward-facing position adjacent the door with a first chamber in the inflated position.

With reference to FIG. 1, the vehicle 12 may be any suitable type of automobile, e.g., a passenger or commercial automobile such as a sedan, a coupe, a truck, a sport utility, a crossover, a van, a minivan, a taxi, a bus, etc. The vehicle 12, for example, may be autonomous. In other words, the vehicle 12 may be autonomously operated such that the vehicle 12 may be driven without constant attention from a driver, i.e., the vehicle 12 may be self-driving without human input.

The vehicle 12 includes a body (not numbered) including rockers, roof rails, pillars, body panels, vehicle roof, vehicle floor, etc. The vehicle 12 includes a passenger compartment (not numbered) to house vehicle occupants, if any, of the vehicle 12. The passenger compartment may extend across the vehicle 12, i.e., from one side to the other side of the vehicle 12. The passenger compartment includes a front end and a rear end with the front end being in front of the rear end during forward movement of the vehicle 12.

With continued reference to FIG. 1, the vehicle 12 may include one or more seats 16. Specifically, the vehicle 12 may include any suitable number of seats 16. As shown in FIG. 1, the seats 16 are supported by the vehicle floor (not numbered). The seats 16 may be arranged in any suitable arrangement in the passenger compartment. As in the example shown in the Figures, one or more of the seats 16 may be at the front end of the passenger compartment, e.g., a driver seat and/or a passenger seat. In other examples, one or more of the seats 16 may be behind the front end of the passenger compartment, e.g., at the rear end of the passenger compartment. The seats 16 may be movable relative to the vehicle floor to various positions, e.g., movable fore-and-aft and/or cross-vehicle 12. The seat 16 may be of any suitable type, e.g., a bucket seat.

The seat 16 includes the seatback (not numbered) and a seat bottom (not numbered). The seatback may be supported by the seat bottom and may be stationary or movable relative to the seat bottom. The seatback and the seat bottom may be adjustable in multiple degrees of freedom. Specifically, the seatback and the seat bottom may themselves be adjustable. In other words, adjustable components within the seatback and/or the seat bottom, and/or may be adjustable relative to each other.

Each seat 16 may rotate about a vertical axis (not numbered) that extends through the vehicle roof and the vehicle floor. Specifically, each seat 16 may define a rotational position about the vertical axis. For example, the seats 16 may rotate between a forward-facing position and a rearward-facing position. In the forward-facing position, an occupant of the seat 16 faces the front end of the passenger compartment. In the rearward-facing position, an occupant of the seat 16 faces the rear end of the passenger compartment. The seats 16 may rotate completely, i.e., 360°, about the vertical axis. The seats 16 may rotate between fixed positions, e.g., the forward-facing position and the rearward-facing position, or may be rotatable to an infinite number of positions.

Each of the seats 16 may be movable along a vehicle-longitudinal direction L. Specifically, each seat 16 may define a longitudinal position along the vehicle-longitudinal direction L. The seat 16 may be movable toward the front end of the vehicle 12 along the vehicle-longitudinal direction L, i.e., forward in the vehicle 12, and the seat 16 may be movable toward the rear end of the vehicle 12 along the vehicle-longitudinal direction L, i.e., rearward in the vehicle 12. Each seat 16 may be movable along the vehicle-longitudinal direction L when the seat 16 is in the forward-facing position and when the seat 16 is in the rearward-facing position.

With continued reference to FIG. 1, the vehicle 12 includes a plurality of doors 22 openable for vehicle occupants to enter and exit a passenger compartment. Each of the doors 22 are adjacent a seat 16 in the vehicle 12. Each of the front seats 16 and each of the rear seats 16 may be adjacent a door 22 of the vehicle 12. Specifically, each front seat 16 may be adjacent a front door 22 and each rear seat 16 may be adjacent a rear door 22. The doors 22 are vehicle-outboard from each of the front seats 16 and each of the rear seats 16.

The roof rails (not numbered) contact a top edge of the doors 22 when the doors 22 are closed. Each door 22 includes at least one door panel and a door-trim panel 24 supported on the door panel. Specifically, the door 22 may include two panels 26, 28, namely a door inner 26 and a door outer 28. In such an example, the door-trim panel 24 and the door outer 28 are fixed to the door inner 26. The door-trim panel 24 is positioned opposite the door outer 28. The door-trim panel 24 is inboard relative to the door inner 26, and the door outer 28 is outboard relative to the door inner 26. The door 22 includes a window opening that may be completely closed by a window of the window is in a fully raised position. The window opening is defined by the door-trim panel 24 and door outer 28 on a bottom edge and either by the door inner 26 circumscribing the window opening or by the body, e.g., the A pillar, the B pillar, and the roof rail. The door outer 28 faces outboard relative to the vehicle 12.

The door outer 28 may define a portion of the exterior of the vehicle 12. For example, the door outer 28 may present a class-A surface, i.e., a surface specifically manufactured to have a high-quality, finished aesthetic appearance free of blemishes. The door outer 28 may be metal (such as steel, aluminum, etc.) or polymeric (such as fiber reinforced plastic composite, etc.).

The door inner 26 may be metal (such as steel, aluminum, etc.) or polymeric (such as fiber reinforced plastic composite, etc.). The door inner 26 provides structural rigidity for the door outer 28. The door inner 26 may provide a mounting location for components of the door 22.

The door-trim panel 24 may be a material suitable for an interior of the vehicle 12, such as vinyl, plastic, leather, wood, etc.

With continued reference to FIG. 1, one or more of the doors 22 may include an airbag assembly 30. Specifically, the airbag assembly 30 being supported by one or more of the door panels 26, 28 adjacent one or more of the seats 16. The airbag assembly 30 may be between the door-trim panel 24 and the door panels 26, 28.

The airbag assembly 30 may include a housing (not shown), an inflator 32, and the airbag 20. The inflator 32 is fluidly connected to each of the inflation chambers 18. The inflator 32 expands the airbag 20 with inflation medium, such as a gas, to move the airbag 20 from an uninflated position to the inflated position. The inflator 32 may be, for example, a pyrotechnic inflator that ignites a chemical reaction to generate the inflation medium, a stored gas inflator that releases (e.g., by a pyrotechnic valve) stored gas as the inflation medium, or a hybrid.

The airbag assembly 30, i.e., the airbag 20, includes the plurality of inflation chambers 18. Each of the inflation chambers 18 is inflatable from an uninflated position to an inflated position. The inflation chambers 18 may be supported by the door panels 26, 28. The plurality of inflation chambers 18 may be separated from each other along a vehicle-longitudinal direction L. Specifically, the inflation chambers 18 may be separated from each other along the door panels 26, 28 in the vehicle-longitudinal direction L. Each of the inflation chambers 18 are fluidly isolated from each other. In other words, the inflation medium from the inflator 32 may not pass between the inflation chambers 18 when one or more of the inflation chambers 18 is in the inflated position.

Figure 6:
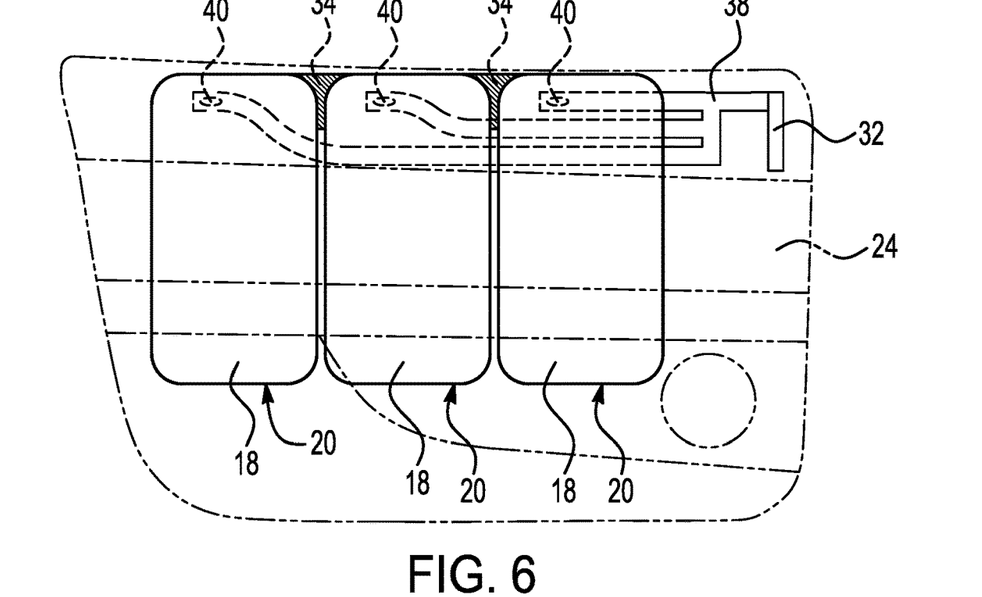
FIG. 6 is a side view of a door trim panel having the airbag assembly with a plurality of fill tubes extending from an inflator to a plurality of inflation chambers.
Figure 7:
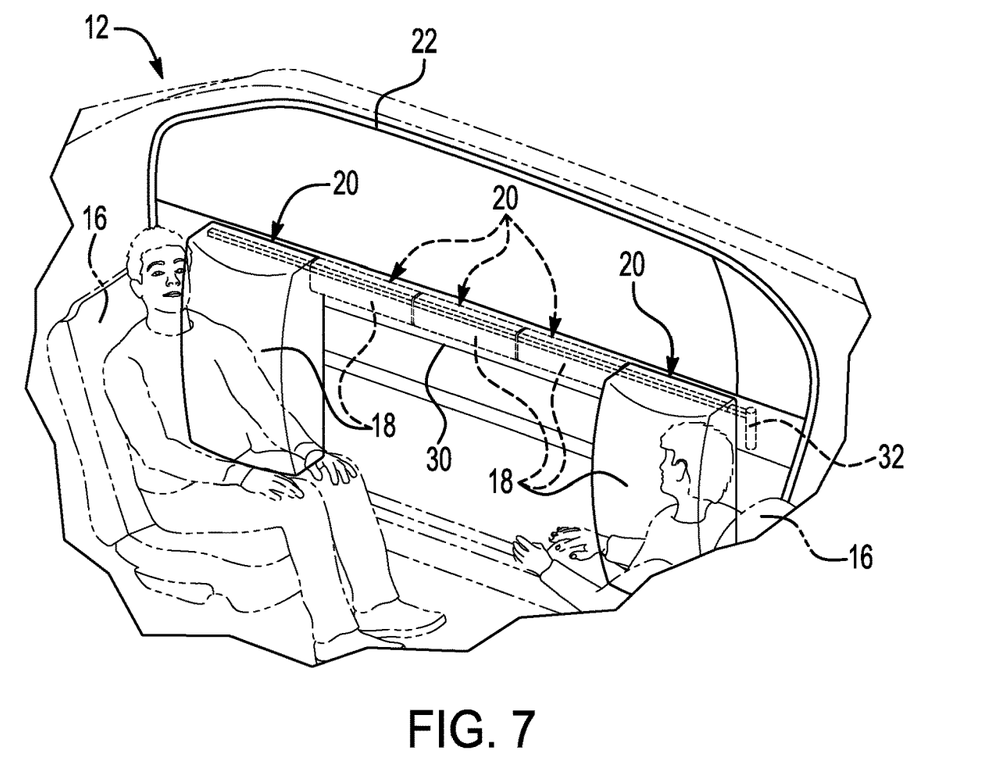
FIG. 7 is a side view of a door including an airbag assembly including a plurality of inflation chambers.

The number of inflation chambers 18 may depend on the range of motion of the seat 16, the length of the door 22 adjacent the seat 16, and the granularity of desired inflation control. For example, as shown in FIGS. 1-6B, the airbag 20 includes three inflation chambers 18 separated from each other along the door panels 26, 28. In such an example, the airbag 20 includes a first chamber 18 position vehicle-forward along the door-trim panel 24, a second chamber 18 positioned vehicle-rearward along the door-trim panel 24, a third chamber 18 between the first chamber 18 and the second chamber 18. As another example, as shown in FIG. 7, the airbag 20 includes five inflation chambers 18 separated from each other along the door panels 26, 28. In such an example, the airbag 20 includes a first chamber 18 vehicle-forward along the door-trim panel 24, a second chamber 18 positioned vehicle-rearward along the door-trim panel 24, and a third, a fourth, and a fifth chamber 18 each being adjacent to each other and between the first chamber 18 and the second chamber 18. The vehicle 12 may include any suitable number of inflation chambers 18.

The numerical adverbs "first," "second," "third," "fourth," and "fifth" with respect to the inflation chambers 18 are used herein merely as identifiers and do not signify order or importance. The terms "first," "second," "third," "fourth," and "fifth" may be used interchangeably when referring to the inflation chambers 18 as shown in the Figures.

One or more of the inflation chambers 18 may be selectively inflatable. Specifically, inflation of any one or more of the inflation chambers 18 is selected based on the longitudinal position and the rotational position of the seat 16. In other words, one or more of the inflation chambers 18 may be in the inflated position while others are in the uninflated position depending on the longitudinal position and the rotational position of the seat 16.

In the examples shown in FIGS. 4A-C, 5A-B, and 7, different inflation chambers 18 may inflate depending on the longitudinal position and the rotational position of the seat 16. As in the example shown in FIG. 4A, the second chamber is inflated adjacent the seat 16 that is in the forward-facing position and positioned vehicle-rearward along the vehicle-longitudinal axis. As in the example shown in FIG. 4B, the third chamber is inflated adjacent the seat 16 that is in the forward-facing position and is vehicle-forward relative to the longitudinal position shown in FIG. 4A. As in the example shown in FIG. 4C, the first chamber is inflated adjacent the seat 16 that is in the forward-facing position and is vehicle-forward relative to the longitudinal position shown in FIGS. 4A and 4B.

Figures 5A, 5B, 5C:
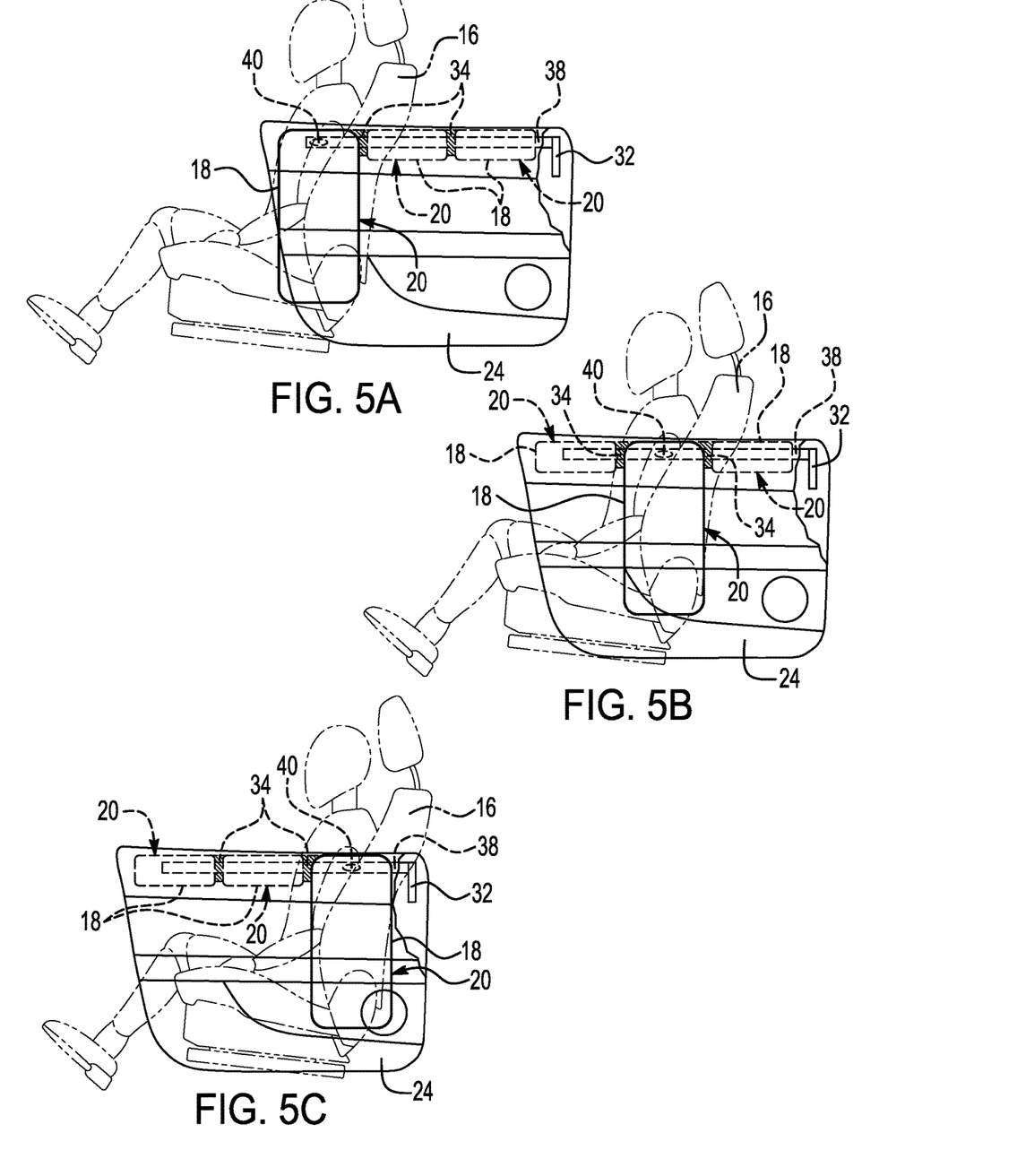
FIG. 5A is a side view of the seat in a rearward-facing position adjacent the door with the third chamber in the inflated position.
FIG. 5B is a side view of the seat in the rearward-facing position adjacent the door with the second chamber in the inflated position.
FIG. 5C is a side view of the seat in the rearward-facing position adjacent the door with the second chamber in the inflate position.

As in the example shown in FIG. 5A, the first chamber is inflated adjacent the seat 16 that is in the rearward-facing position and positioned vehicle-forward along the vehicle-longitudinal axis. As in the example shown in FIG. 5B, the third chamber is inflated adjacent the seat 16 that is in the rearward-facing position and is vehicle-rearward relative to the longitudinal position shown in FIG. 5A.

As in the example shown FIG. 7, the vehicle 12 may include a seat 16 in the forward-facing position and a seat 16 in the rearward-facing position that is vehicle-forward of the seat 16 that is in the forward-facing position. In such an example, the first chamber is inflated adjacent the seat 16 that is in the rearward-facing position and the second chamber is inflated adjacent the seat 16 that is in the forward-facing position.

The inflator 32 may be designed to inflate all the inflation chambers 18 apart of the airbag assembly 30. In other words, the inflation medium produced by the inflator 32 is adequate to inflate all the inflation chambers 18 although the inflation chambers 18 may be selectively inflatable. The airbag assembly 30 may dissipate inflation medium, such as through vents in the airbag assembly 30, to limit over-pressurization of the selectively inflated inflation chambers 18.

The airbag assembly 30, i.e., the airbag 20, includes a plurality of uninflatable panels 34 between each of the inflation chambers 18. The uninflatable panels 34 do not inflate when the inflation chambers 18 inflate to the inflated position. In other words, the uninflatable panels 34 do not fill with inflation medium from the inflator 32.

The door-trim panel 24 may include a releasable seam 36 to allow the inflation chambers 18 to inflate to the inflated position. For example, the door-trim panel 24 may include a tear seam 36 extending along the vehicle-longitudinal direction L adjacent to the airbag assembly 30. As the inflation chambers 18 inflate to the inflated position, the tear seam 36 may release to allow the inflation chambers 18 to extending from between the door panels 26, 28 and the door-trim panel 24 to the inflate position.

The airbag assembly 30 may include one or more fill tubes 38 extending from the inflator 32 to the inflation chambers 18. The inflation medium passes from the inflator 32 and through the one or more fill tubes 38 into the inflation chambers 18. As in the example shown in FIG. 6A, the airbag assembly 30 includes a fill tube 38 extending continuously from the inflator 32 to all the inflation chambers 18. In such an example, the airbag 20 includes a single fill tube 38 extending from the inflator 32 to each of the inflation chambers 18. In a second example, as shown in FIG. 6B, the airbag assembly 30 may include a plurality of fill tubes 38 with each fill tube 38 extends from the inflator 32 to each of the inflation chambers 18. In such an example, the number of fill tubes 38 is equal to the number of inflation chambers 18 included in the airbag assembly 30.

The airbag assembly 30 includes a plurality of control valves 40 between the inflator 32 and the inflation chambers 18. Specifically, a control valve 40 may be between each of the inflation chambers 18 and the inflator 32. The airbag assembly 30 may include a suitable number of control valves 40, i.e., the airbag assembly 30 includes a number of control valves 40 equal to the number of inflation chambers 18.

The control valves 40 allow the inflation chambers 18 to be selectively inflated. In the event of an impact to the vehicle 12, the control valves 40 may be released to allow the selected inflation chambers 18 the ability to inflate to the inflated position. Depending on the longitudinal position of the seat 16 and the rotational position of the seat 16, the control valve 40 associated with the inflation chamber 18 and/or inflation chambers 18 that is/are selected to inflate to the inflated position is released to allow the inflation chamber 18 to move to the inflated position.

The control valves 40 may include a solenoid 42. In the event of an impact to the vehicle 12, the solenoid 42 may be released at the selected inflation chambers 18 to allow the inflation chamber 18 to inflate to the inflated position. The solenoid 42 may include a pin that is releasable in the event of the impact. The solenoid 42 may retract the pin to allow inflation medium to inflate the selected inflation chambers 18 to the inflated position.

The airbag 20, e.g., the inflation chambers 18 and the uninflatable panels 34, may be fabric, e.g., a woven polymer. For example, the fabric may be woven nylon yarn, for example, nylon 6, 6. Other examples of woven polymer include polyether ether ketone (PEEK), polyetherketoneketone (PEKK), polyester, etc. The woven polymer may include a coating, such as silicone, neoprene, urethane, etc. For example, the coating may be polyorgano siloxane.

Figure 8:
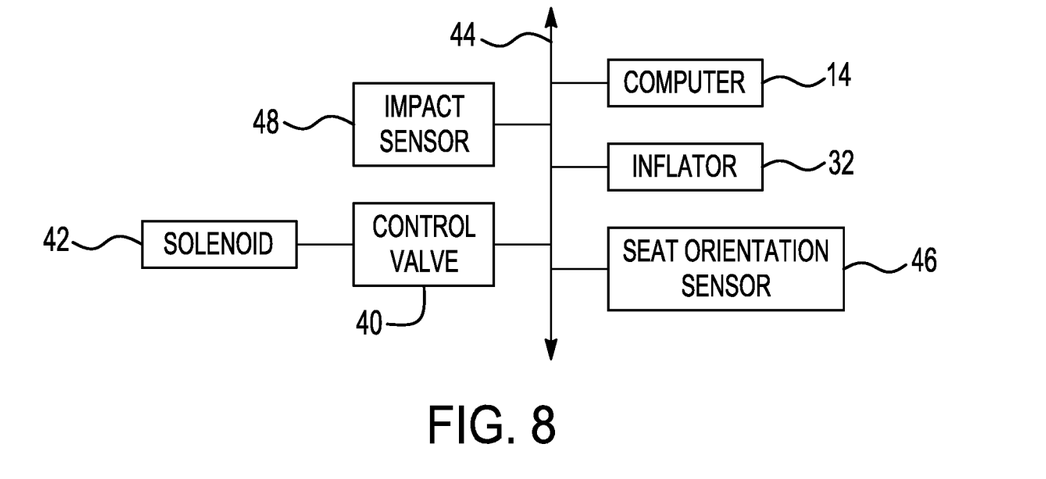
FIG. 8 is a block diagram showing a vehicle communication network of the vehicle.

As shown in FIG. 8, the vehicle 12 includes the computer 14 that includes the processor and the memory such as are known. The memory includes one or more forms of computer readable media, and stores instructions executable by the computer 14 for performing various operations, including as disclosed herein. The computer 14 may include programming to operate one or more of vehicle brakes, propulsion (e.g., control of acceleration in the vehicle 12 by controlling one or more of an internal combustion engine, electric motor, hybrid engine, etc.), steering, climate control, interior and/or exterior lights, etc., as well as to determine whether and when the computer 14, as opposed to a human operator, is to control such operations. Additionally, the computer 14 may be programmed to determine whether and when a human operator is to control such operations.

The computer 14 may include or be communicatively coupled to, e.g., via a vehicle network such as a communications bus as described further below, more than one processor, e.g., included in components such as sensors, electronic controller units (ECUs) or the like included in the vehicle 12 for monitoring and/or controlling various vehicle components, e.g., a powertrain controller, a brake controller, a steering controller, etc.

With continued reference to FIG. 8, the computer 14 is generally arranged for communications on a vehicle communication network 44 that can include a bus in the vehicle 12 such as a controller area network (CAN) or the like, and/or other wired and/or wireless mechanisms. Via the vehicle communication network 44, the computer 14 may transmit messages to various devices in the vehicle 12 and/or receive messages (e.g., CAN messages) from the various devices, e.g., sensors, an actuator, a human machine interface (HMI), etc. Alternatively or additionally, in cases where the computer 14 actually comprises a plurality of devices, the vehicle communication network 44 may be used for communications between devices represented as the computer 14 in this disclosure. Further, as mentioned below, various controllers and/or sensors may provide data to the computer 14 via the vehicle communication network 44.

The vehicle 12 may include at least one impact sensor 48 for sensing impact of the vehicle 12, and the computer 14 may be in communication with the impact sensors 48. The impact sensor 48 is configured to detect an impact to the vehicle 12. The impact sensor 48 may be of any suitable type, for example, post-contact sensors such as accelerometers, pressure sensors, and contact switches; and pre-impact sensors such as radar, LIDAR, and vision-sensing systems. The vision-sensing systems may include one or more cameras, CCD image sensors, CMOS image sensors, etc. The impact sensor 48 may be located at numerous points in or on the vehicle 12.

The vehicle 12 may include seat orientation sensors 46 to determine the orientation of the seat 16 and/or seats 16, i.e., the seat orientation sensors 46 may identify a rotational position of the seat, i.e., whether the seats 16 are in the forward-facing position or the rearward-facing position, and a longitudinal position of the seat 16, i.e., the location of the seat 16 along the vehicle-longitudinal direction L. The seat orientation sensors 46 may be in communication with the computer 14. The seat orientation sensors 46 may send a signal to the computer 14 to identify rotational position and the longitudinal position of the seat 16. The vehicle 12 may include any suitable number of seat orientation sensors 46 to determine the orientation of multiple seats 16 in the vehicle 12. In other words, the vehicle 12 may include a number of seat orientation sensors 46 equal to the number of seats 16 that are rotatable in the vehicle 12. The vehicle 12 may include separate sensors for identification of the rotational position of the seat 16 and identification of the longitudinal position of the seat 16.

Figure 9:
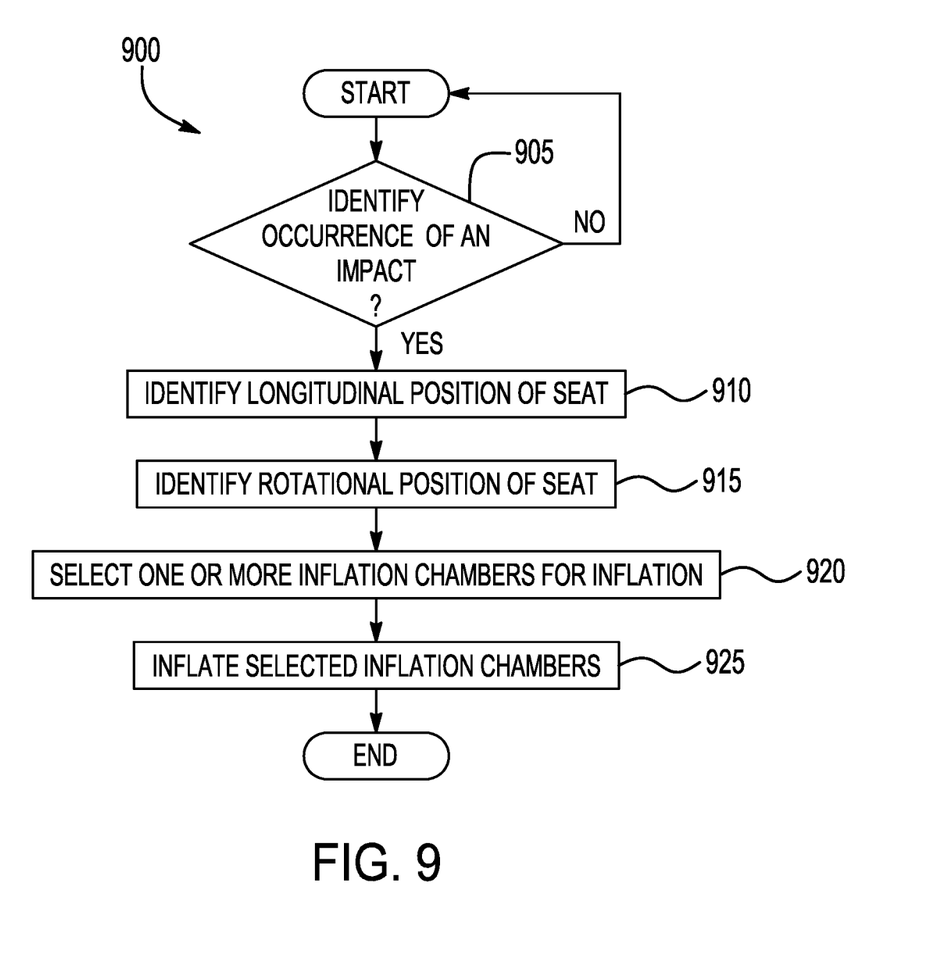
FIG. 9 is a flow chart showing a method executable by a computer of the vehicle.

With reference to FIG. 9, the computer 14 stores instructions to control components of the vehicle 12 according to the method 900. Specifically, as shown in FIG. 9, based on the longitudinal position and the rotational position, the computer 14 selectively inflate one or more of the inflation chambers 18 of the airbag 20. The phrases "upon," "in response to," and "based on" are used here to refer to causal relationships.

With reference to decision block 905, the method includes identifying the occurrence of an impact. If no impact is identified, the method returns to the start. If an impact is identified, the method continues to block 910. The impact sensors 48 may identify an impact to the vehicle 12 and send a signal over the communication network to the computer 14 to continue the method.

With reference to block 910, the method includes identifying the longitudinal position of the seat 16. Upon identifying the impact has occurred to the vehicle 12, the seat orientation sensor 46 may send a signal to the computer 14 indicate the longitudinal position of the seat 16, i.e., the location along the vehicle-longitudinal axis of the seat 16.

With reference to block 915, the method includes identifying the rotational position of the seat 16. Upon identifying the impact has occurred to the vehicle 12, the seat orientation sensor 46 may send a signal to the computer 14 indicating the rotational position of the seat 16. Specifically, the orientation sensor may indicate whether the seat 16 is in the forward-facing position or the rearward-facing position.

With reference to block 920, upon identifying the longitudinal position and the rotational position of the seat 16, the method includes selecting inflating one or more of the inflation chambers 18 for inflation. The one or more of the inflation chambers 18 is based on the longitudinal position and the rotational position of the seat 16.

With reference to block 925, the method includes inflating the selected inflation chambers 18 identified at block 920. For example, as shown in FIGS. 4A-C, 5A-B, and 7, selected inflation chambers 18 may be in the inflated position depending on the longitudinal position and the rotational position of the seat 16. The computer 14 may activate the inflator 32 to inflate the selected inflation chamber 18 or inflation chambers 18. For example, the computer 14 may release one or more of the control valves 40 between the inflator 32 and each of the selected inflation chambers 18. The control valves 40 released correspond to the inflation chambers 18 that have been selected to inflate based on the longitudinal position and the rotational position of the seat. In an example where control valves 40 include a solenoid 42, the releasing of the control valves 40 may include releasing the solenoid 42 corresponding to the control valves 40 at the selected inflation chambers 18.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

What is claimed is:

1. A system comprising a computer including a processor and a memory storing instructions executable by the processor to:
   identify a longitudinal position of a vehicle seat along a longitudinal axis of a vehicle;
   identify a rotational position of the vehicle seat; and
   selectively inflate one or more of a plurality of inflation chambers of an airbag each supported by a door of the vehicle, the plurality of inflation chambers being separated from each other along the longitudinal axis of the vehicle;
   wherein selectively inflating the inflation chambers includes inflating one or more of the inflation chambers from the door adjacent the vehicle seat based on the longitudinal position and the rotational position of the vehicle seat.

2. The system of claim 1, wherein the instructions to selectively inflate the one or more of a plurality of inflation chambers includes instructions to activate an inflator.

3. The system of claim 2, wherein the instructions to selectively inflate the one or more of a plurality of inflation chambers includes instructions to release one or more of a plurality of control valves between the inflator and each of the inflation chambers.

4. The system of claim 3, wherein the instructions to release one or more of the plurality of control valves include instructions to release a solenoid of at least one of the control valves.

5. The system of claim 2, further comprising a plurality of fill tubes, each fill tube extending from the inflator to each of the inflation chambers.

6. The system of claim 2, further comprising a fill tube extending continuously from the inflator to all the inflation chambers.

7. The system of claim 1, wherein the plurality of inflation chambers are fluidly isolated from each other.

8. The system of claim 1, further comprising a plurality of uninflatable panels, each of the uninflatable panels being between each of the inflation chambers.

9. A vehicle comprising:
   a seat;
   a door;
   an airbag assembly including a plurality of inflation chambers fluidly isolated from each other and separated from each other along a longitudinal axis of the vehicle, each of the inflation chambers being supported by the door; and
   a computer including a processor and a memory storing instructions executable by the processor to:
      identify a longitudinal position of the seat along the longitudinal axis of the vehicle;
      identify a rotational position of the seat; and
      selectively inflate one or more of the inflation chambers from the door adjacent the seat based the longitudinal position and the rotational position of the seat.

10. The vehicle of claim 9, wherein the airbag assembly includes an inflator fluidly connected to each of the inflation chambers.

11. The vehicle of claim 10, wherein the airbag assembly includes a plurality of control valves between the inflator and the inflation chambers.

12. The vehicle of claim 11, wherein the instructions to selectively inflate one or more of the inflation chambers include instructions to release at least one of the control valves.

13. The vehicle of claim 11, wherein each of the control valves include a solenoid and the instructions to release at least one of the control valves includes instructions to release the solenoids.

14. The vehicle of claim 11, further comprising a plurality of fill tubes, each fill tube extending from the inflator to each of the inflation chambers.

15. The vehicle of claim 11, wherein the inflator includes a fill tube extending continuously from the inflator to all the inflation chambers.

16. The vehicle of claim 9, further comprising a door panel adjacent the seat, the airbag assembly being supported by the door panel adjacent the seat.

17. The vehicle of claim 16, further comprising a door-trim panel supported by the door panel, the airbag assembly being between the door panel and the door-trim panel.

18. The vehicle of claim 16, wherein each of the plurality of inflation chambers are separated from each other along the door panel in a vehicle-longitudinal direction.

19. The system of claim 9, further comprising a plurality of uninflatable panels, each of the uninflatable panels being between each of the inflation chambers.

* * * * *